US006010121A

United States Patent [19]

Lee

[11] Patent Number: 6,010,121

[45] Date of Patent: Jan. 4, 2000

[54] WORK PIECE CLAMPING DEVICE OF WORKBENCH

[76] Inventor: Chi Ping Lee, No. 158, Renhua Rd., Dali City, Taichung County, Taiwan

[21] Appl. No.: 09/296,051

[22] Filed: Apr. 21, 1999

[51] Int. Cl.[7] ........................................ B23Q 3/02

[52] U.S. Cl. ........................ 269/94; 269/100; 269/236; 269/215

[58] Field of Search ........................ 269/91–94, 239, 269/97, 100, 236, 215

[56] References Cited

U.S. PATENT DOCUMENTS

| | | | |
|---|---|---|---|
| 3,210,069 | 10/1965 | Holtz | 269/94 |
| 3,436,072 | 4/1969 | Svenson | 269/94 |
| 4,432,538 | 2/1984 | Sequin | 269/93 |
| 4,981,289 | 1/1991 | Duval | 269/94 |

*Primary Examiner*—Robert C. Watson
*Attorney, Agent, or Firm*—Pro-Techtor International Services

[57] ABSTRACT

A work piece clamping device is composed of a clamping block, a locking cover, a plate button, a support rod, a press rod, a tightening nut engaged with the press rod, and a fastening member. The clamping block is provided with a vertical wall for locating a work piece in place on a workbench top. The clamping block can be moved up and down along the support rod by the fastening member which is located under the workbench top and is movably fitted over the support rod. The clamping block is exerted on by the pressure of the plate button so as to hold securely the work piece on the workbench top.

3 Claims, 11 Drawing Sheets

WORK PIECE CLAMPING DEVICE OF WORKBENCH

FIELD OF THE INVENTION

The present invention relates generally to a work piece clamping device, and more particularly to the work piece clamping device intended for use with a workbench.

BACKGROUND OF THE INVENTION

As shown in FIGS. 1 and 2, a work piece clamping device of the prior art is composed of a main clamping block 10, a press block 20, a tightening nut 30, and a main bracing rod 40. The main clamping block 10 is of an arcuate construction and is provided in the center thereof with a through hole 11 having at one end thereof an arcuate surface 12. The press block 20 is of an arcuate construction and in contact with the arcuate surface 12. The press block 20 is provided at the center thereof with a through hole 21. The tightening nut 30 is a winged nut. The main bracing rod 40 is a threaded rod which is provided at one end thereof with a stop surface 41. The main bracing rod 40 is jutted out of a locating hole 51 of the workbench top 50 such that the stop surface 41 of the main bracing rod 40 urges the underside of the bench top 50. The main clamping block 10 is engaged with the main bracing rod 40 via the through hole 11. When a work piece 60 is to be secured by the main clamping block 10, the tightening nut 30 must be first loosened so as to unable the main clamping block 10 to move upwards. After the main clamping block 10 is moved upwards, the work piece 60 is located under the main clamping block 10 before the tightening nut 30 is tightened to put the pressure on the press block 20, which in turn puts the pressure on the main clamping block 10 to hold he work piece 60 securely. The main bracing rod 40 is kept perpendicular to the bench top 50 while the work piece 60 is clamped by the main clamping block 10.

When the work piece 60 is fastened or unfastened by the main clamping block 10, the tightening nut 30 must be turned on the main bracing rod 40 back and forth. The is rather time-consuming. In addition, the main bracing rod 40 must be replaced with one which has a greater length so as to facilitate the clamping of a relatively large work piece 60 by the main clamping block 10.

SUMMARY OF THE INVENTION

The present invention is intended to provide a workbench with an improved work piece clamping device free from the drawbacks of the work piece clamping device of the prior art.

In keeping with the principle of the present invention, the foregoing objective of the present invention is attained by the improved work piece clamping device, which consists of a main clamping block, a locking cover, a plate button, a main support rod, a press rod, a tightening nut, and a fastening set. The main clamping block can be moved up and down along the main support rod by means of the fastening set, so as to enable the plate button to put the pressure on the locking cover, which in turn puts the pressure on the main clamping block to hold securely a work piece. The main clamping block is provided with a vertical surface for clamping or urging the work piece. The main clamping block can be caused to displace horizontally by pressing the press rod by the tightening nut.

DETAILED DESCRIPTION OF THE INVENTION

Figure 1:
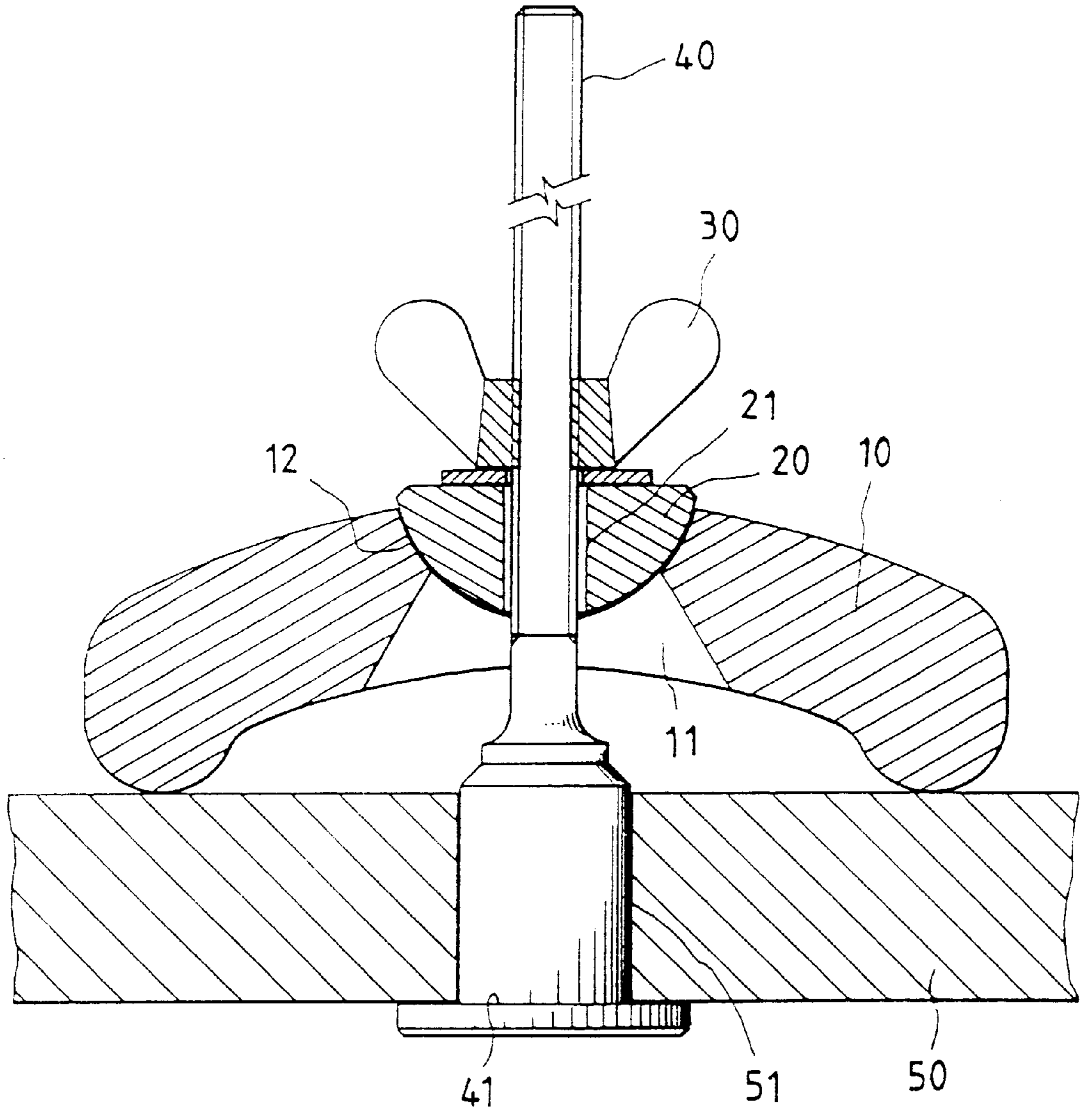
Prior Art FIG.1
FIG. 1 shows a sectional schematic view of a work piece clamping device of the prior art.
Figure 2:
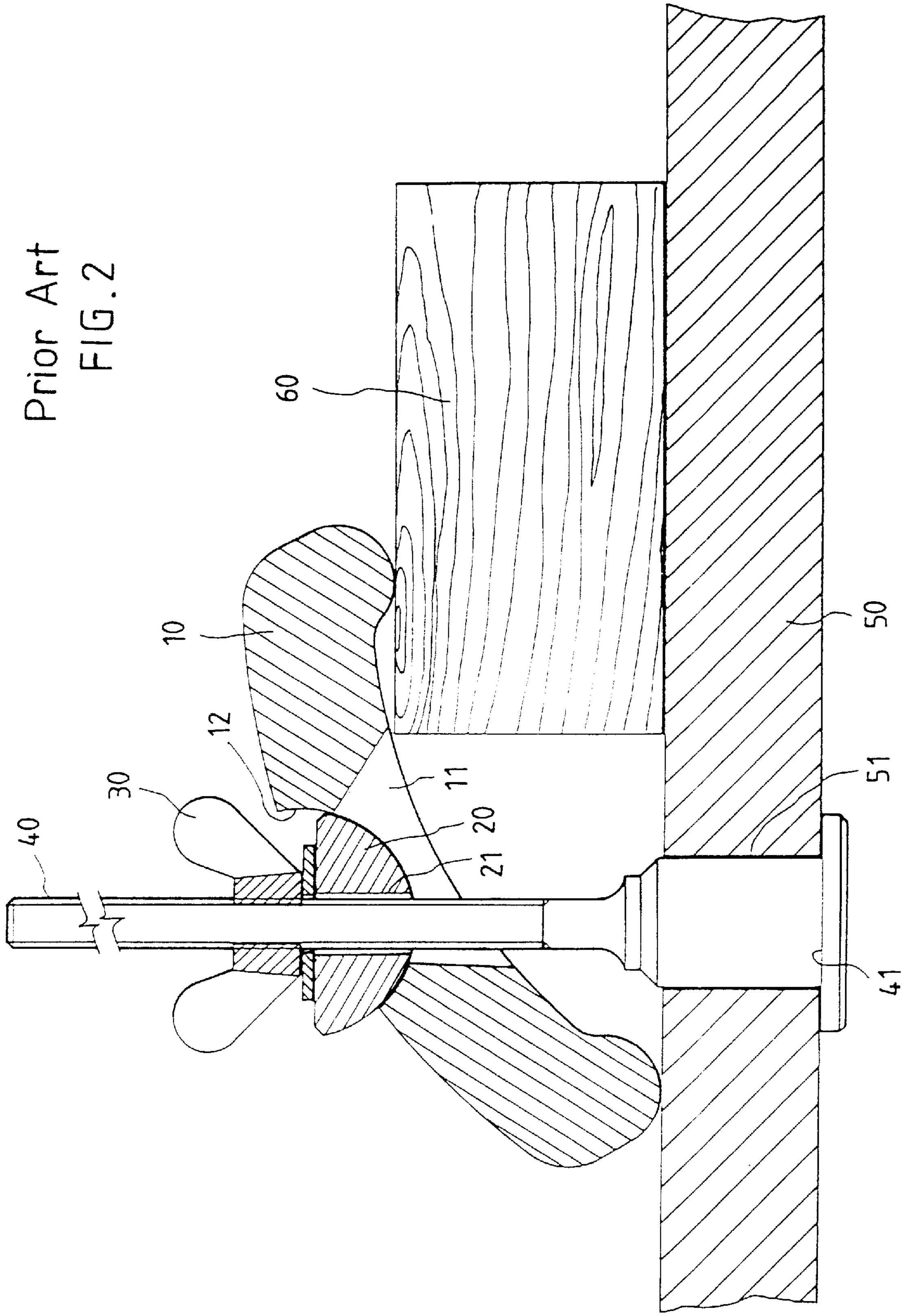
Prior Art FIG. 2
FIG. 2 shows a schematic view of the work piece clamping device of the prior art at work.
Figure 3:
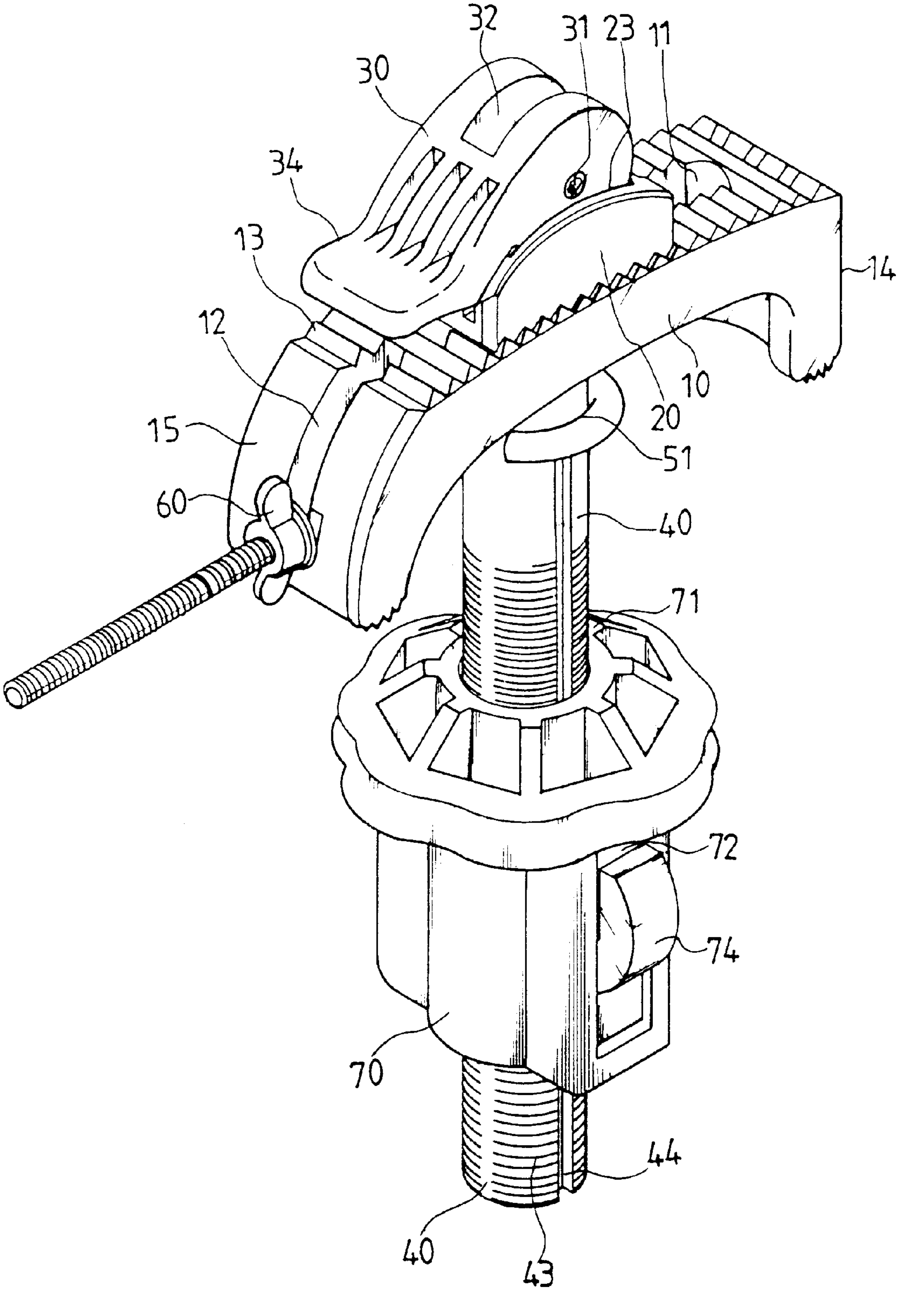
FIG. 3 shows a perspective view of a work piece clamping device of the present invention.
Figure 4:
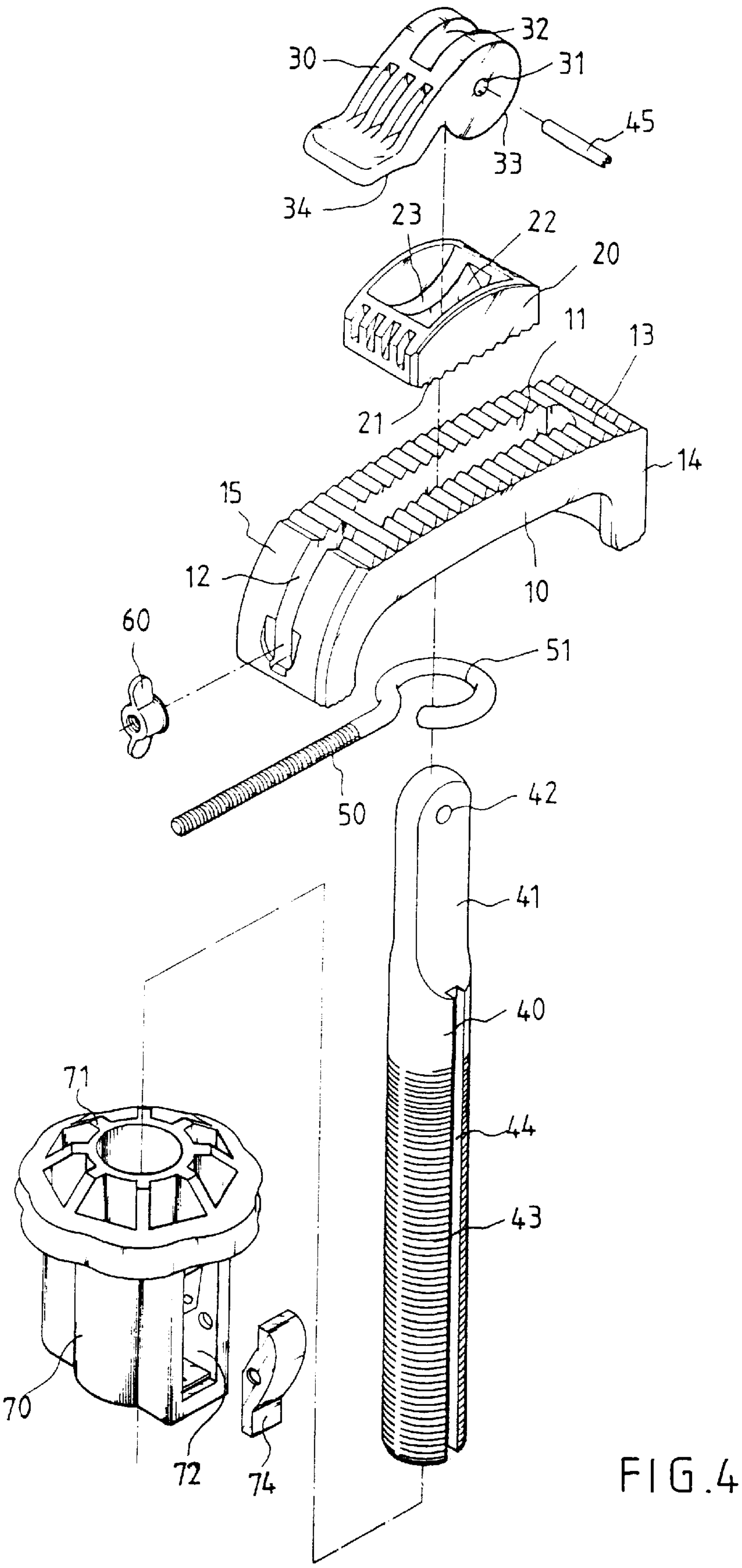
FIG. 4 shows an exploded view of the work piece clamping device of the present invention.
Figure 5:
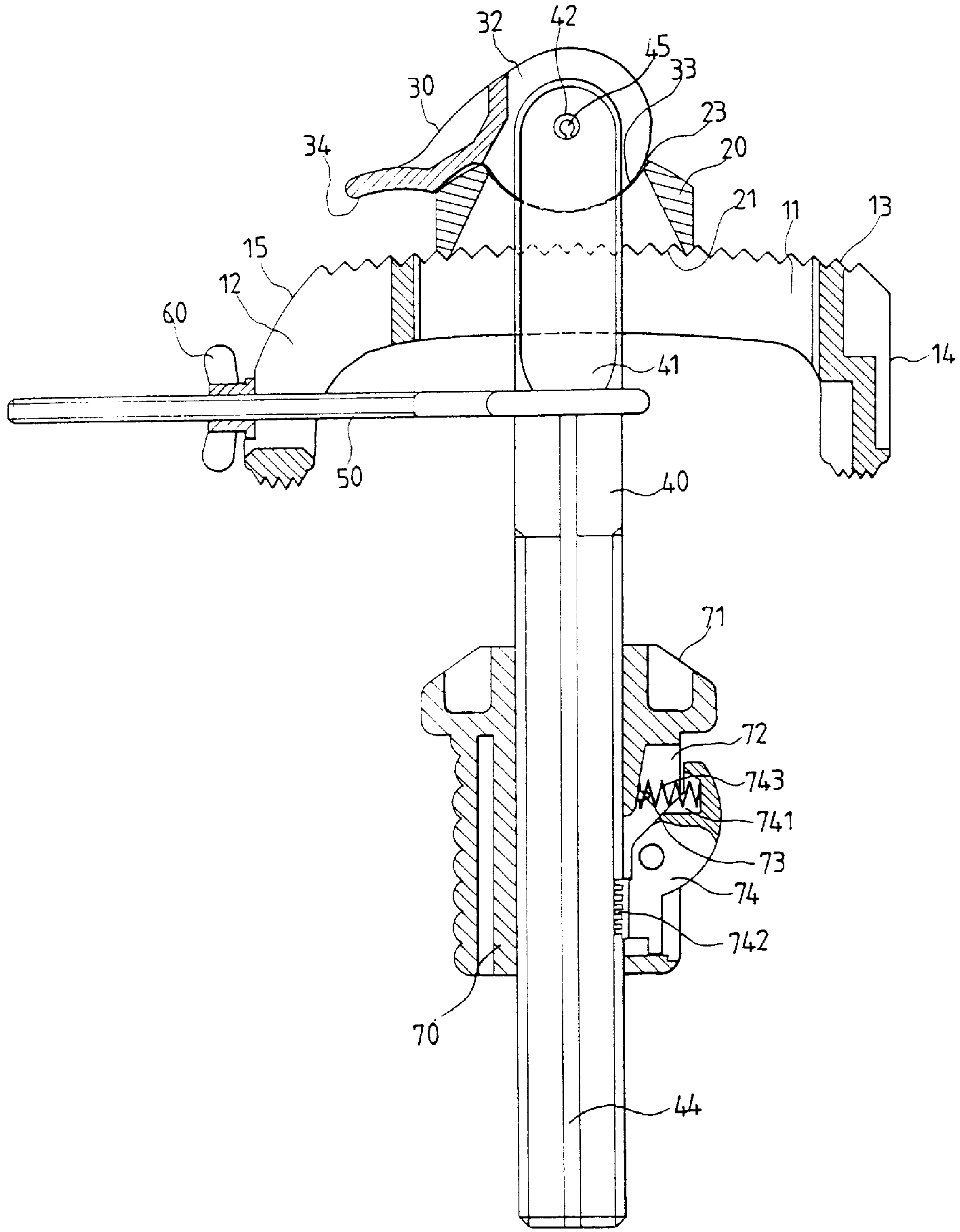
FIG. 5 shows a sectional schematic view of the present invention in combination.
Figure 6:
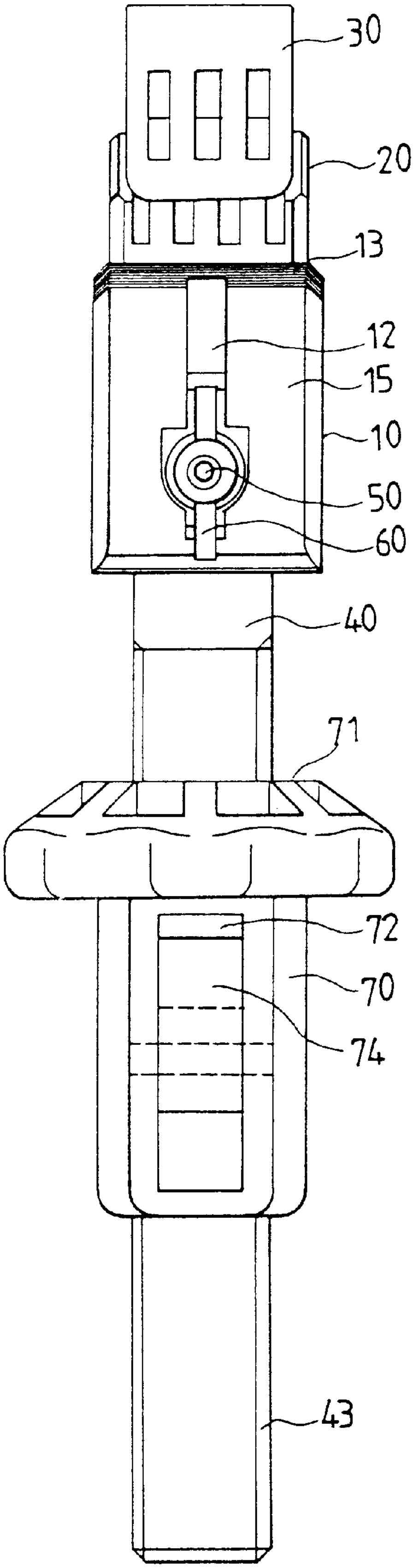
FIG. 6 shows a left elevational view of the present invention in combination.
Figure 7:
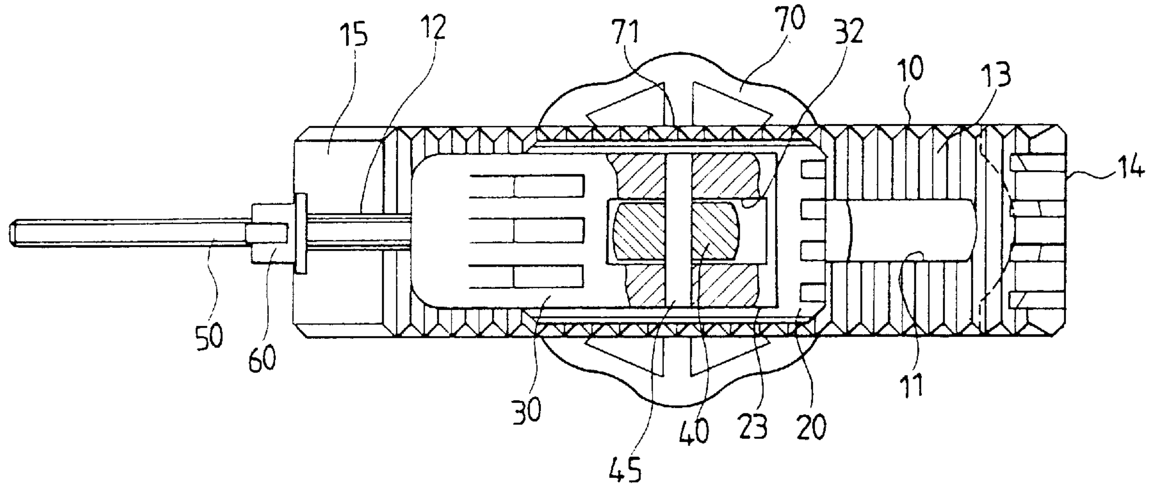
FIG. 7 shows a top plan view of the present invention in combination.
Figure 8:
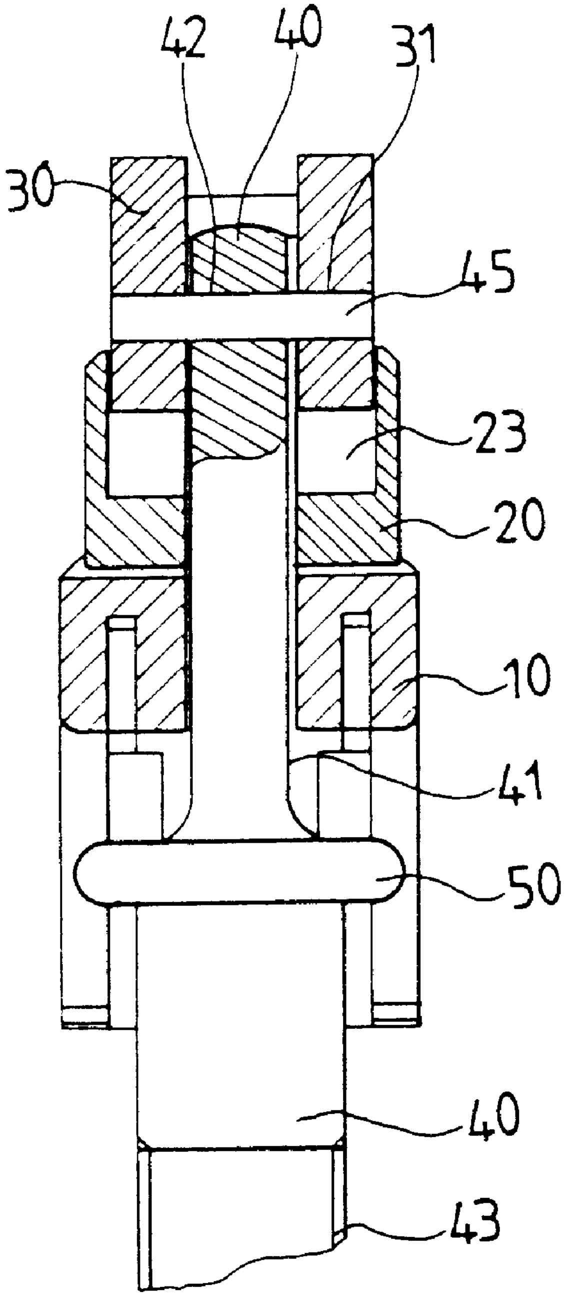
FIG. 8 shows a partial sectional view taken from the right side of the present invention in combination.

As shown in FIGS. 3, 4 and 5, a work piece clamping device embodied in the present invention is intended for use along with a workbench 80 and composed of a main clamping block 10, a locking cover 20, a plate button 30, a main support rod 40, a press rod 50, a tightening nut 60, and a fastening member 70.

The main clamping block 10 is provided in the upper surface thereof with a longitudinal through slot 11, a groove 12 contiguous to the longitudinal slot 11, and a plurality of retaining teeth 13. The main clamping block 10 is further provided at one longitudinal end thereof with a vertical wall 14, and at other longitudinal end thereof with an arcuate surface 15.

The locking cover 20 is provided in the underside thereof with a plurality of retaining teeth 21 corresponding in construction to the retaining teeth 13 of the main clamping block 10. The locking cover 20 is further provided with a sectoral slot 22 and an arcuate slot 23 in communication with the sectoral slot 22. The locking cover 20 is located on the main clamping block 10 such that the retaining teeth 21 of the locking cover 20 are engaged with the retaining teeth 13 of the main clamping block 10.

The plate button 30 is provided at one end thereof with two eccentric lugs 33 each having a through hole 31 for receiving a pin 45. Located between the two lugs 33 is a through slot 32. The plate button 30 is further provided at other end thereof with an arcuate portion 34.

The main support rod 40 is provided at the upper end thereof with an engaging portion 41 having a through hole 42, and at the lower end thereof with a threaded portion 43 having two reinforcing slots 44 opposite in location to each other and extending along the direction of the longitudinal axis of the main support rod 40. The engaging portion 41 is received in loop 51 of a threaded press rod 50 which is located under the main clamping block 10. The engaging portion 41 is fastened with the plate button 30 by the pin 45 which is received in the through holes 31 of the two lugs 33 of the plate button 30 and the through hole 42 of the main support rod 40. The engaging portion 41 is put through the through slot 11 of the main clamping block 10, the sectoral slot 22 of the locking cover 20, and the through slot 32 of the plate button 30.

The tightening nut 60 is of a winged construction and is engaged with the threaded press rod 50 which is located in the groove 12 of the main clamping block 10. The tightening nut 60 can be moved along the threaded press rod 50 to press against the arcuate surface 15 of the main clamping block 10.

The fastening member 70 is of a hollow cylindrical construction and is provided with an axial hole. The fastening member 70 is provided at the top end thereof with an urging portion 71, and in the longitudinal side wall thereof with an opening 72 which is in turn provided at the upper end thereof with a projection 73, and an actuation piece 74 pivoted thereto. The actuation piece 74 is provided at the top end thereof with an indentation 741, and at the bottom end thereof with a retaining portion 742, and a spring 743 having one end which urges the bottom wall of the indentation 741, and having other end which is fitted over the projection 73. The spring 743 provides an elastic force enabling the retaining portion 742 of the actuation piece 74 to be elastically pressed.

The device of the present invention is fastened with the workbench top 80 such that the support rod 40 is received in a through hole 81 of the workbench top 80, and that the urging portion 71 of the fastening member 70 presses against the underside of the workbench top 80. As the actuation piece 74 is pressed, the retaining portion 742 of the actuation piece 74 is no longer engaged with the outer threads of the threaded portion 43 of the main support rod 40. As a result, the fastening member 70 can be moved up and down along the threaded portion 43 of the support rod 40.

Figure 9:
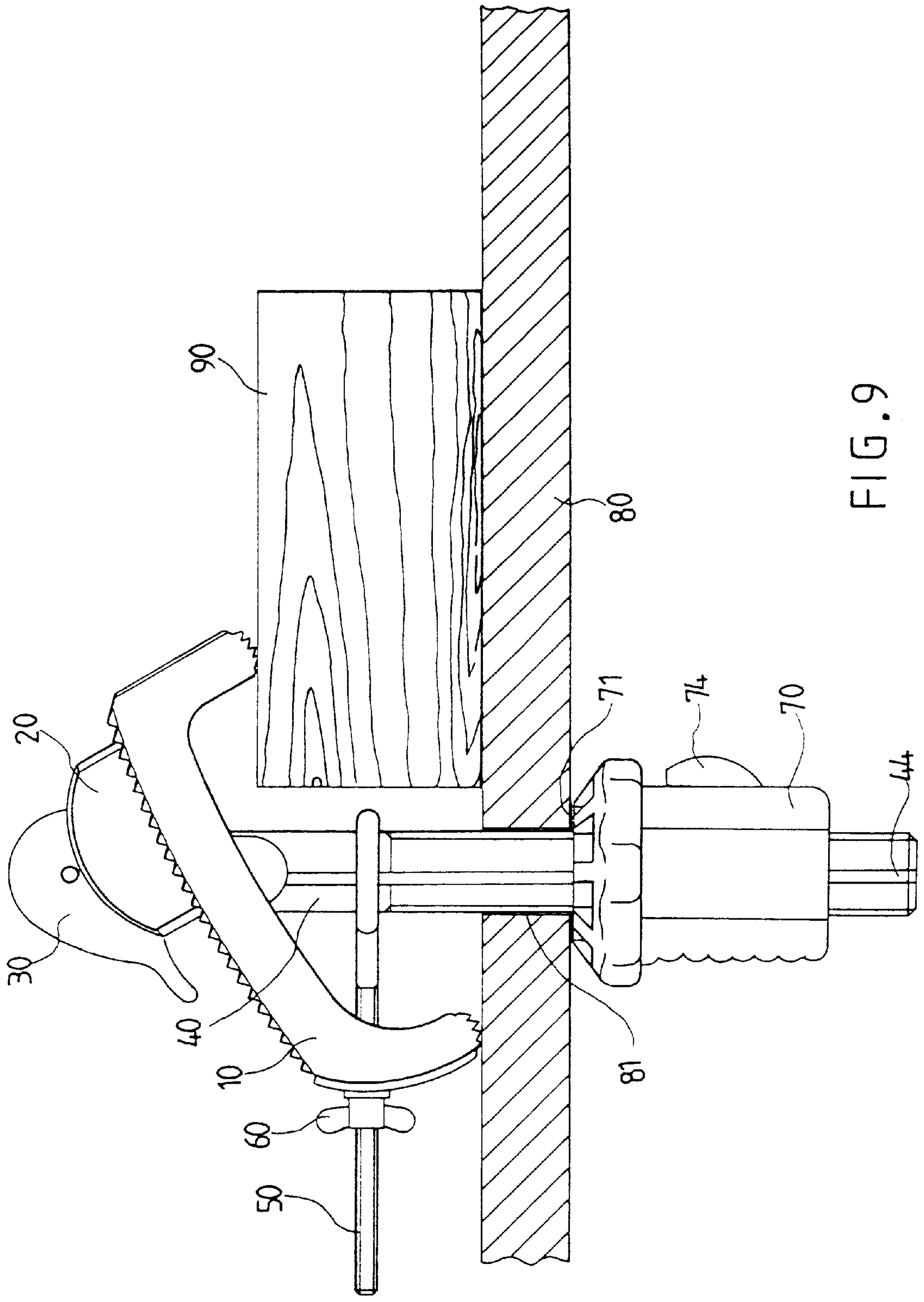
FIG. 9 shows a schematic view of the present invention at work.

As shown in FIG. 9 a work piece 90 is held securely in place on the workbench top 80 by the free end of the vertical wall 14 of the clamping block 10 of the present invention. By moving the arcuate portion 34 of the plate button 30, the lugs 33 of the plate button 30 are caused to move in the arcuate slot 23 of the locking cover 20 to pull the main support rod 40, thereby resulting in a reaction force, which acts on the locking cover 20 and the claming block 10. In light of the engagement of the retaining teeth 21 of the locking cover 20 with the retaining teeth 13 of the clamping block 10, the locking cover 20 is secured in place on the clamping block 10.

Figure 10:
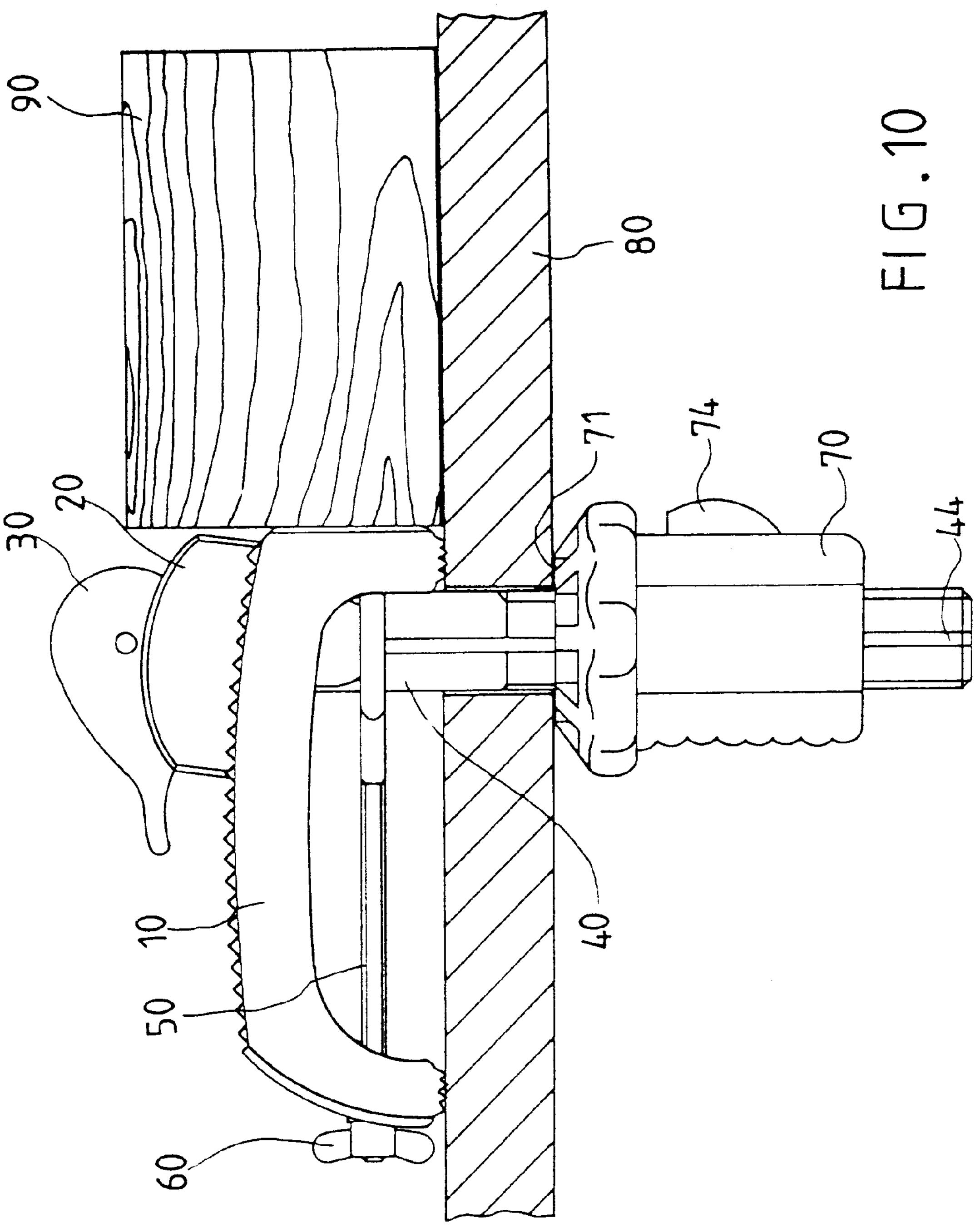
FIG. 10 shows another schematic view of the present invention at work.

As shown in FIG. 10, the work piece 90 is located on the workbench top 80 such that the work piece 90 is pressed against the vertical wall 14 of the clamping block 10. As the tightening nut 60 is displaced toward the free end of the threaded press rod 50, the vertical wall 14 of the clamping block 10 is perpendicular to the workbench top 80. By actuating the arcuate portion 34 of plate button 30, the clamping block 10 can be located by moving the tightening nut 60 in the direction away from the free end of the threaded press rod 50 such that the tightening nut 60 presses against the arcuate surface 15 of the clamping block 10.

Figure 11:
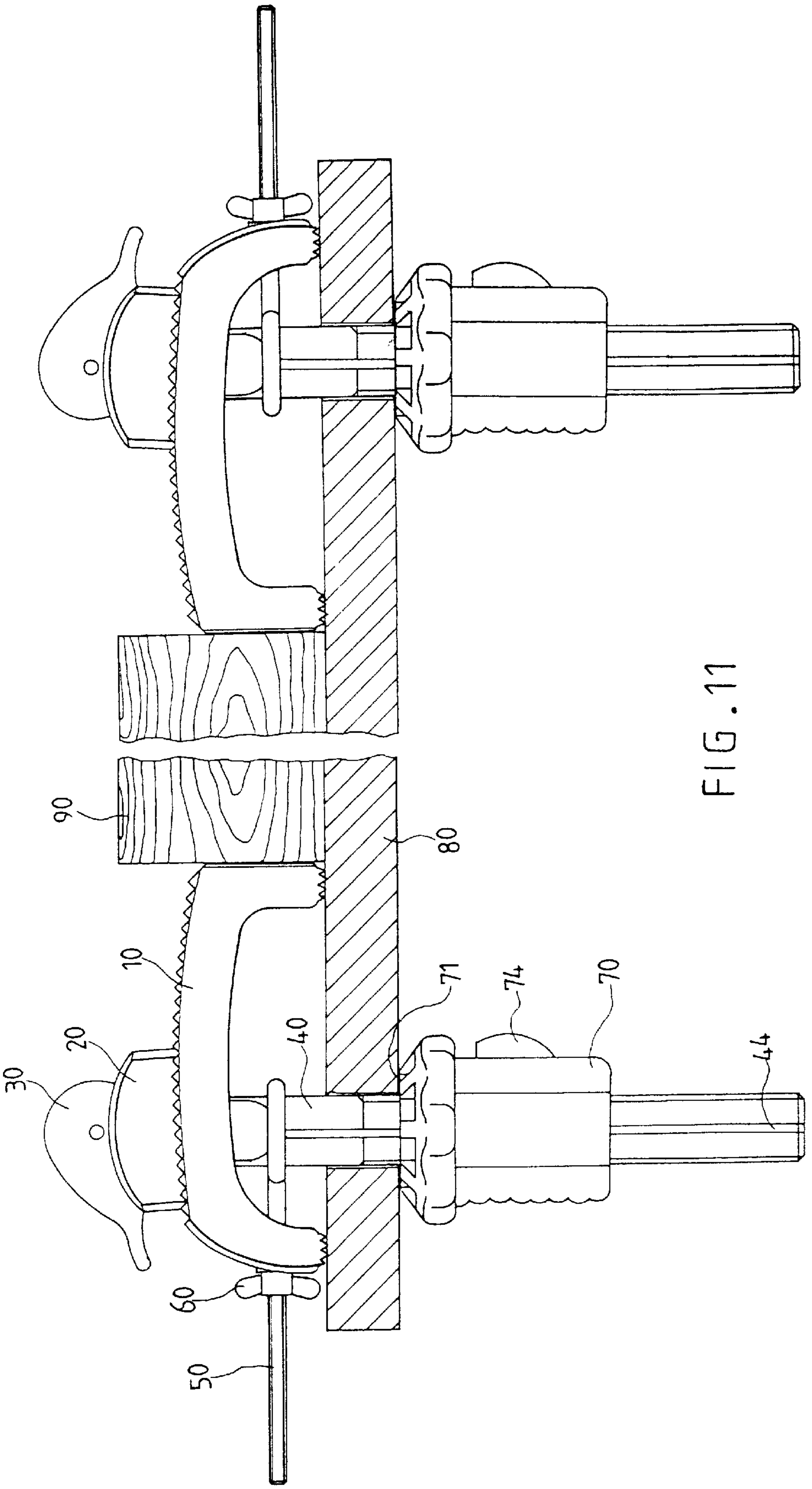
FIG. 11 shows still another schematic view of the present invention at work.

The work piece 90 may be held securely in place on the workbench top 80 by two devices of the present invention, as shown in FIG. 11. In such a situation, the workbench top 80 must be provided with two through holes 81 to accommodate the two support rods 40 of the two devices of the present invention. The work piece 90 is held securely in place on the workbench top 80 by the two vertical walls 14 of the two clamping blocks 10 of the two devices of the present invention.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A work piece clamping device for holding securely a work piece in place on a workbench top, said work piece clamping device comprising:

a clamping block provided in an upper surface thereof with a through slot extending in the direction of a longitudinal axis of said clamping block, a groove, and a plurality of retaining teeth, said clamping block further provided at one end of the longitudinal axis thereof with a vertical wall, and at other end of the longitudinal axis thereof with an arcuate surface;

a locking cover provided in an underside thereof with a plurality of retaining teeth corresponding in construction to and engagedable with said retaining teeth of said clamping block, said locating cover further provided with a sectoral slot and an arcuate slot in communication with said sectoral slot, said locking cover being located on said clamping block such that said retaining teeth of said locking cover are engaged with said retaining teeth of said clamping block;

a plate button provided at one end thereof with two eccentric lugs each having a through hole for receiving a pin, and a through slot located between said two eccentric lugs, said plate button further provided at other end thereof with an arcuate portion;

a support rod provided at an upper end thereof with an engaging portion having a through hole, and at a lower end thereof with a threaded portion, said engaging portion being received in a loop of a threaded press rod located under said clamping block such that said engaging portion is fastened with said plate button located on said locking cover, and that said engaging portion is fastened with plate button by said pin which is received in said through holes of said two eccentric lugs and said through hole of said engaging portion of said support rod, and further that said engaging portion is fastened with said plate button via said through slot of said clamping block, said sectoral slot of said locking cover, and said through slot of said plate button, and still further that said support rod is located in one of a plurality of through holes of the workbench top;

a tightening nut engaged with said threaded press rod located in said groove of said clamping block such that said tightening nut can be moved back and forth along said threaded press rod, and that said tightening nut can be moved along said threaded press rod to urge said arcuate surface of said clamping block; and a fastening member of a hollow cylindrical construction and provided with an axial hole for receiving said support rod which is located in said through hole of the workbench top, said fastening member provided at a top end thereof with an urging portion, and in a longitudinal side wall thereof with an opening of a size and having a projection, said opening provided with an actuation piece of a size and fastened pivotally therewith, said actuation piece provided at one end thereof with an indentation, and at other end thereof with a retaining portion and a spring having one end which urges a bottom wall of said indentation, said spring having other end which is fitted over said projection of said opening, said spring having an elastic force enabling said retaining portion of said actuation piece to be elastically pressed, said fastening member being located under the workbench top such that said threaded portion of said support rod is received in said axial hole of said fastening member, and that said fastening member can be moved up along said threaded portion of said support rod to enable said urging portion of said fastening member to press against the underside of the workbench top, and further that said fastening member can be moved down along said threaded portion of said support rod at such time when said actuation piece is pressed to cause said retaining portion of said actuation piece to become disengaged with said threaded portion of said support rod.

2. The work piece clamping device as defined in claim 1, wherein said threaded portion of said support rod is provided with two reinforcing slots opposite in location to each other and extending along the direction of a longitudinal axis of aid support rod.

3. The work piece clamping device as defined in claim 1, wherein said tightening nut is of a winged construction.

* * * * *